Nov. 5, 1968 P. MAURICE 3,408,969
CONTINUOUS OPERATION WASTE INCINERATOR
Filed Aug. 17, 1967 4 Sheets-Sheet 1

INVENTOR
PIERRE MAURICE
BY Young + Thompson
ATTYS.

Nov. 5, 1968    P. MAURICE    3,408,969
CONTINUOUS OPERATION WASTE INCINERATOR
Filed Aug. 17, 1967    4 Sheets-Sheet 2

INVENTOR
PIERRE MAURICE
By Young + Thompson
ATTYS.

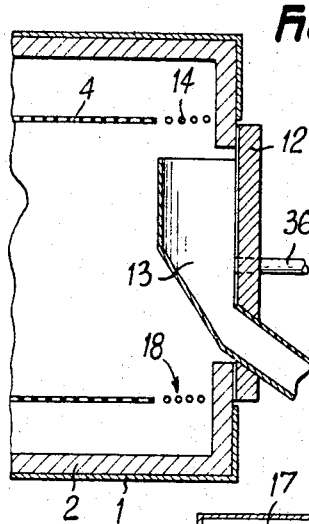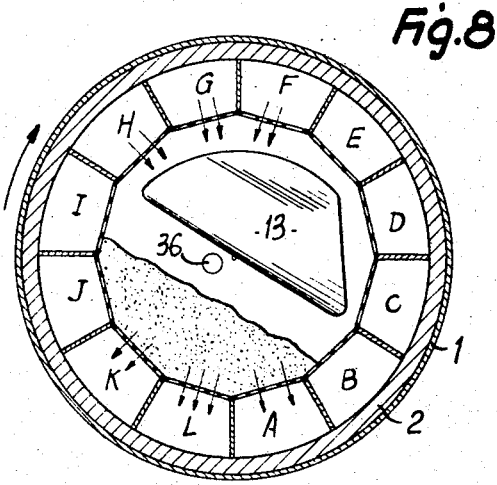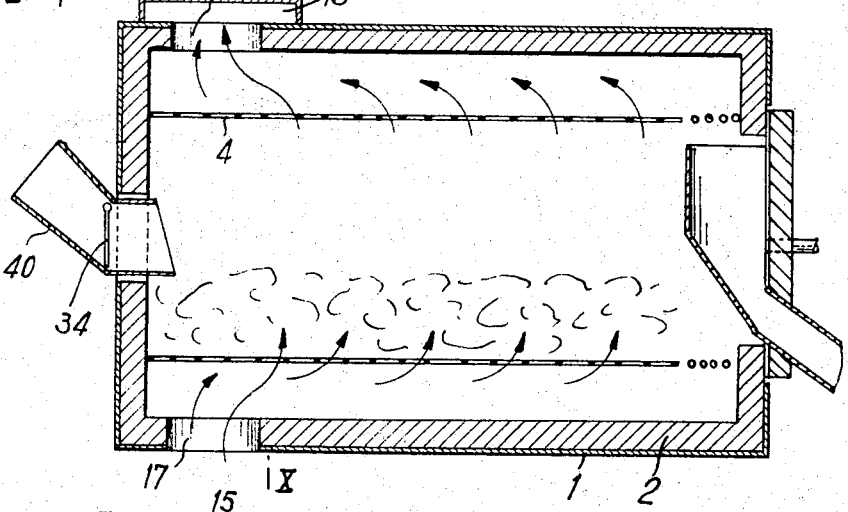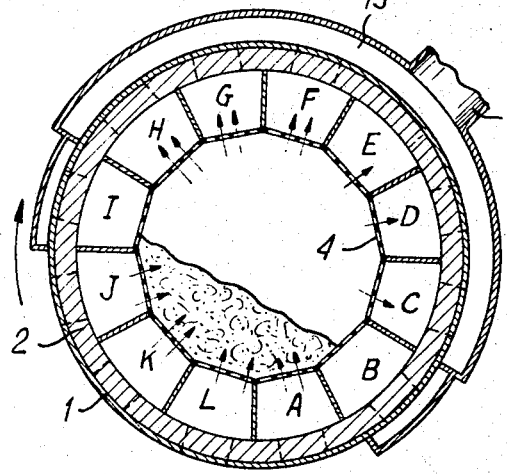

Nov. 5, 1968  P. MAURICE  3,408,969
CONTINUOUS OPERATION WASTE INCINERATOR
Filed Aug. 17, 1967  4 Sheets-Sheet 4

INVENTOR
PIERRE MAURICE
By Young & Thompson
Attys.

United States Patent Office 3,408,969
Patented Nov. 5, 1968

3,408,969
CONTINUOUS OPERATION WASTE INCINERATOR
Pierre Maurice, Paris, France, assignor to
La Soudure Autogene Francaise
Continuation-in-part of application Ser. No. 494,683,
Oct. 11, 1965. This application Aug. 17, 1967, Ser.
No. 661,304
Claims priority, application France, Nov. 4, 1964,
993,805
12 Claims. (Cl. 110—14)

ABSTRACT OF THE DISCLOSURE

A gas-permeable cylinder affixed to a rotating casing through partitions, receives the wastes to be burned. Air is admitted into those of the compartments which are between certain partitions, flows through cylinder, burns the wastes, flows through another portion of the cylinder, through other compartments and to the chimney. Strips helically affixed to the grates which form cylinder, stir and move the wastes.

---

This application is a continuation-in-part of application Ser. No. 494,683, filed Oct. 11, 1965, now abandoned.

This invention relates to a novel type of incinerator and to the method of operation of the same, for improving the efficiency of incinerating processes and notably the thermal efficiency of waste incineration.

The thermal efficiency is most important in the case of moist wastes, since, due to the amount of water they contain, a large adduction of calories is required to evaporate the water before the incineration can begin, or be completed.

On the other hand, it is essential that the smells and fumes from the incineration be suppressed, which requires that the flue gases be raised to a high temperature, e.g., 600° C. A large number of calories is again required. For instance, if 1 kg. of dry waste requires 16 kg. of air for burning, and if the average specific heat of the fumes is 0.25 cal./g., the heat required to raise the temperature of the fumes from 20° C. to 600° C. is:

$$0.25 \times 16 \times 580 = 2{,}320 \text{ cal./kg.}$$

It is readily seen, therefore, that the highest possible thermal efficiency is essential.

The main object of this invention is therefore a novel type of incinerator, wherein the fumes from waste incineration are sent through suitable grates, where they lose a large amount of calories, which are then recovered by the combustive air at the moment when, under the action of the continuous rotation of the incinerator, the said grates receive the wastes to be incinerated.

A further object of the invention is the elimination, in the course of the stirring operation, of all combustion residues, whether entirely burned out or not, the dimensions of which are smaller than a given size.

A further object of the invention is a novel type of revolving incinerator with horizontal axis, specially developed for the practice of the above method, the features and advantages of which, such as the discharge of the ashes and the circulation of the fumes, will be apparent from the drawing hereinafter appended, in which:

FIG. 7 is an axial section of the cylinder and the rear portion of the apparatus;

FIG. 8 is a section at right angles to the axis of the rear portion of the apparatus;

FIG. 9 is a simplified diagram of an axial section, showing the circulating circuit of the air and fumes;

FIG. 10 is a simplified diagram of a section through plane X, X of FIG. 9, showing the fume-discharging device;

Figure 1:
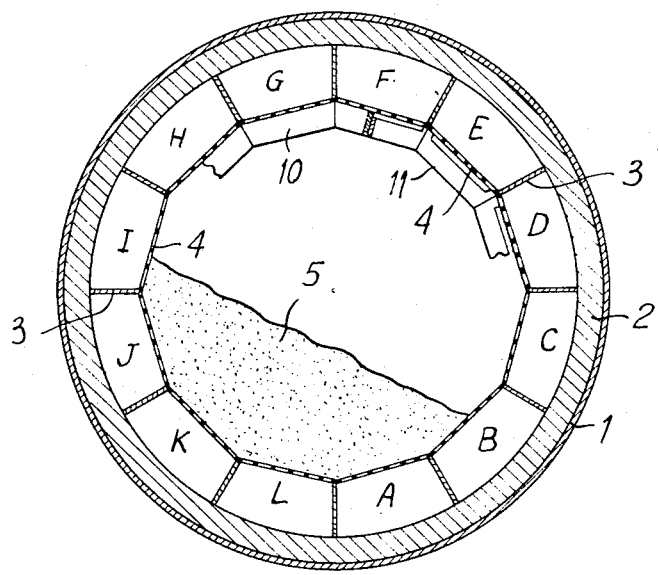
FIG. 1 is a section of the incinerator at right angles to its axis, showing the arrangement of the compartments used notably for circulating air and fumes.

The incinerator of the invention has the appearance of a revolving cylinder or container with a horizontal axis, a section of which, in the central portion, is shown on FIG. 1.

Steel sleeve 1 is inwardly lined with a refractory concrete layer 2, which may of course be replaced with any other heat-insulating lining, such as a brick lining or a cushion of rock wool wedged between sleeve 1 and a stainless steel sheet, when the substances to be burned have a comparatively high heat content, e.g., 2,000 kcal./hr.

Inside the optional lining are distributed, all around the cylinder, compartments shown by the letters A to L, separated by partitions 3. The number of compartments may be varied.

Figure 12:
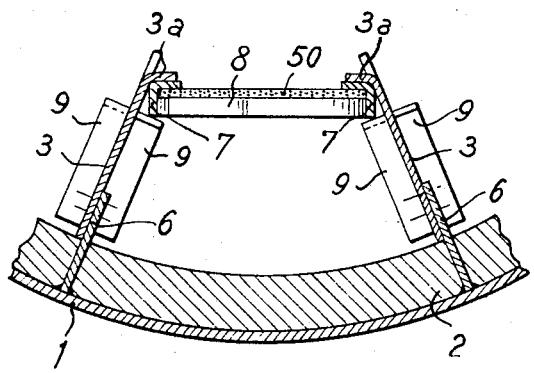
FIG. 12 is a view similar to a portion of FIG. 3 but showing an alternative form of grating.

The upper portion of each compartment is a grate 4, made of a stack of heat-resisting steel wire nets (e.g., 18/8 stainless) or a stainless steel perforated sheet. The stack, the part played by which will be explained hereafter, may be partly or wholly replaced by a layer of steel wool. Grate 4, being thin relatively to the diameter of the apparatus, is represented in FIGS. 1, 3, 7, 8, 9, 10 by dashes between broken lines. In FIG. 12, grate 4 is replaced by a stack 50 of steel wire nets or screens. When the incinerator revolves, the wastes introduced onto those grates in the front portion of the apparatus tend to form a bank, which is shown at 5.

Owing to the large variations of temperature inside the incinerator, partitions 3 between the compartment are made of heat-resisting steel and are so assembled as to eliminate the disadvantages due to expansion.

Figure 2:
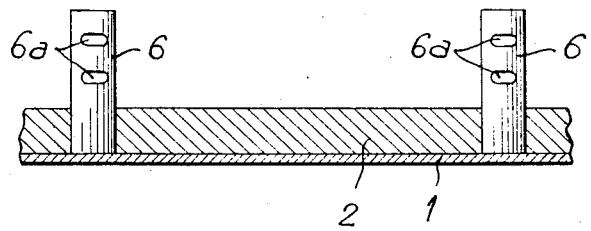
FIG. 2 shows elements distributed along a generatrix of the cylinder, and used for holding the partitions between adjacent compartments.

For this purpose, the partitions are fastened to parts shown at 6 in FIG. 2, provided with apertures 6a giving clearance to the fastening elements. The latter are unspecified and are not shown on the drawing. Parts 6 are welded to sleeve 1 before the refractory concrete 2 is cast, or before the heat-insulating lining is laid. Such protective linings are not required when the heat content of the materials to be burned is not very high.

The partitions can undergo longitudinal expansion without any transverse strain.

Figure 3:
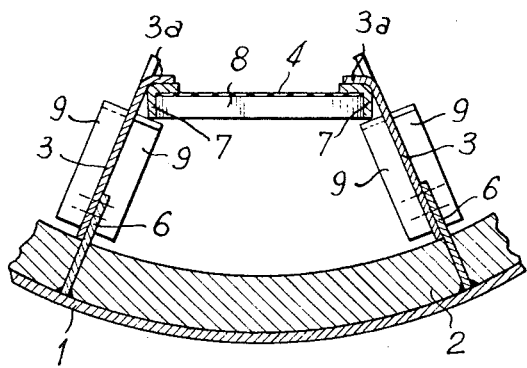
FIG. 3 is a diagrammatic view of a compartment, showing an arrangement for holding the grates between two consecutive partitions, and the deflector plates providing for the continuous discharge of the ashes and dust.

FIG. 3 shows, as an illustration, an embodiment of the fastening of grates 4 with partitions 3. Grating stack 4 is clamped between two angle irons 7 and crosspieces 8. Those crosspieces are at an angle to the angle irons, 60° in FIG. 4; they are one of the means for discharging the ashes and dust collected in each compartment, as explained hereafter. Angle irons 7 are wedged between tabs 3a of the partitions 3 and deflectors 9 fastened to the partitions, tabs 3a being alternately bent toward the angle irons of the two adjacent compartments. Those deflectors are also at an angle of 45° to the angle irons. In FIG. 3 are also shown the parts 6 to which are fastened the represented partitions.

Figure 4:
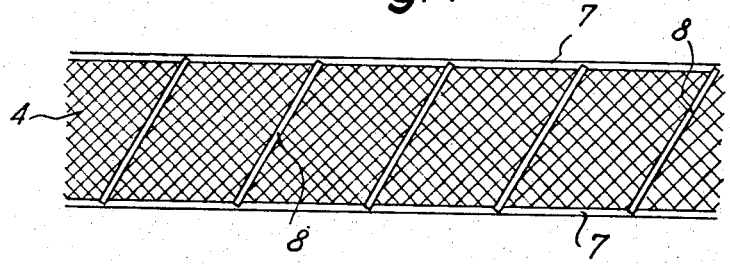
FIG. 4 shows the grates from inside the dust discharge compartments.

FIG. 4, which shows the gratings from inside a compartment, clearly shows how crosspieces 8 sustain grating 4 placed between angle irons 7, and also shows the slant of those crosspieces.

Figure 5:
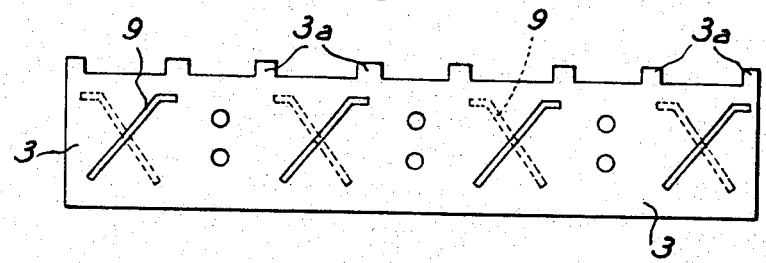
FIG. 5 shows a partition, the castellations of which have not been flanged.

FIG. 5 shows tabs 3a of the partitions 3 before they are flanged alternately towards each of neighboring compartments. This figure shows the slant of deflecting plates 9 on either side of each partition.

The arrangement of plates 9 and of crosspieces 8 is so designed as to form inside each compartment the elements of an Archimedean screw, which is interrupted only on heat-insulating lining 2.

When the incinerator revolves, the ashes and dust which have gone through the gratings or sheet 4 therefore tend to move towards the rear portion of the apparatus.

Figure 6:
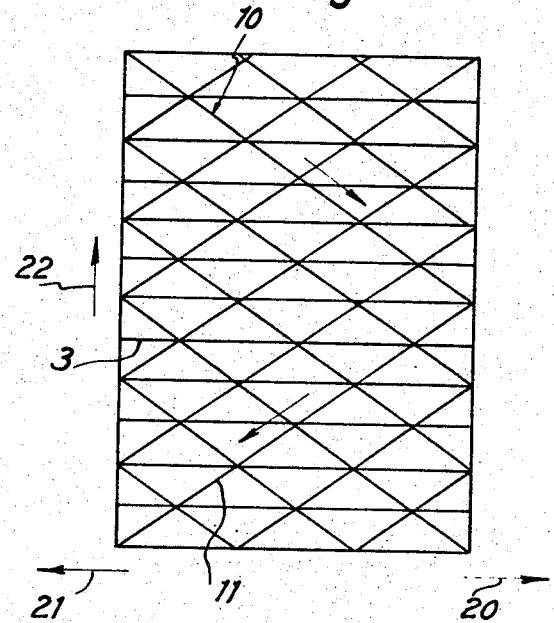
FIG. 6 is a diagrammatic view of the developed incinerator cylinder, and shows the deflectors for stirring the wastes.

The wastes, which may be introduced by any suitable means through the front of the apparatus, are drawn alternately towards the rear of the apparatus (direction shown by arrow 20, FIG. 6), then towards the front (arrow 21). This is due to the apparatus revolving in the direction of arrow 22 and to the presence of a series of strips such as 10 and 11. FIG. 6 also shows partitions 3 diagrammatically. Strips 10, directly fastened on the grates, push the wastes backwards, while strips 11 fastened to the angle irons 7 merely push insufficiently incinerated wastes forward. As it is represented in FIG. 1, clearances are provided between the grates and strips 11, so as to leave behind the material reduced by incineration to a given size. According to a preferred embodiment of the invention, strips 10 carried by grate 4 of a given compartment are parallel and uniformly spaced. The same holds for strips 11. There results a continuous stirring action, which creates a uniform layer wherein the wastes just introduced are brought into intimate contact with the wastes being incinerated or already practically incinerated. Within each series of strips 10 or 11, it is useful that some of the flats be definitely higher than the others (not shown), so as to avoid swamping large wastes, e.g., large packagings, in ashes and small wastes, and to promote the burning of those large wastes.

Strips 11 may often be omitted, strips 10 then extending over the entire grates.

The incinerator works smoothly once at full blast. The operating speed is readily varied through the feeding rate, whether batch or continuous. Wastes collected by trucks are emptied into a hopper, from which they may be carried to the incinerator by a readily adjustable device: a bucket chain, a belt conveyor, or an Archimedean screw.

According to a variation, the incinerator is mounted on a truck. The truck is thus used both for collecting and for destroying the wastes. For this purpose, recovering hopper 13 (FIG. 7) is supplemented with a hopper for the storage of ashes and residues. This improves the efficiency of the trucks, which do not have to go to the incinerating plant when full, and avoids handling the wastes, which are destroyed as soon as they are collected.

Experience shows that, for most combustible wastes, incineration can be considered as completed when the residues go through a grate with 10 mm. spacings between bars; the ashes discharged according to the invention are therefore of that size. For this purpose, the clearance between strips 11 and grates 4 is about 10 mm. This gives at the same time excellent stirring and automatic disposal of the residue; the latter, owing to the size of the apparatus and to the temperature, are sufficiently burned to give odorless and rot-proof ashes.

The ashes, dust and residues are discharged at the back of the apparatus, which back is shown diagrammatically in FIGS. 7 and 8.

For this purpose, grating stack 4 is terminated over a certain length, e.g., 10 to 20 cm., with lattice 14 (10 mm. meshes) or with a grate with a 10 mm. spacing. The ashes drawn to the back of the apparatus gather at 18 (FIG. 7) and fall from there into compartments K and L, for instance, while the ashes which have previously fallen into compartments H and G fall into hopper 13, connected with fixed plate 12. Hopper 13 thus discharges fine ash and residues continuously, the arrows appearing on FIG. 8 representing these ash falls.

Bringing the incinerator up to normal operation requires an adduction of calories until, the apparatus being warmed up and a certain proportion of the wastes being dry, combustion can go on without further adduction of calories, or at least with a reduced adduction.

For this purpose, back plate 12 is fitted with a gas or liquid-fuel burner 36 (FIGS. 7 and 8) which sends its flame into the incinerator. It thus heats the surface of the wastes, which is constantly renewed when the incinerator revolves, and heats up the fumes, thus ensuring their complete combustion.

According to a preferred embodiment of the invention, the back plate rests on a carriage which rolls on a slope. Under its own weight, the back plate therefore tends to bear upon the back face of the incinerator. This arrangement makes it possible to follow the expansion of the incinerator.

So as to increase the thermal efficiency of the incinerator, the combustion fumes go through grates 4 and through the compartments as shown in FIGS. 9 and 10. Apertures 17, distributed at the front of the apparatus, allow each compartment to receive combustive air which, in FIG. 10, goes through compartments A–L–K–J to burn the wastes. From the axial space of the incinerator, the flue gases go through grates 4 of the other compartments and out through the corresponding apertures 17, which lead, as shown in FIG. 10, into a fixed box 15 fitting the shape of sleeve 1 and leading to stack 16. The box covers only about half the compartments while the apertures of the adjacent compartments—which, in the position shown, correspond to compartments I and B, where the wastes only cover part of the grates—are covered up so as to prevent the air from getting in and the fumes from getting out. Those apertures 17 which are not covered by box 15 open directly in the ambient air in order to introduce it into compartments J, K, L, A.

Thanks to this arrangement, the fumes circulated along and through the grates of compartments C to H, for instance, give off a large portion of their heat to those grates before they escape through apertures 17 and box 15 into the stack.

Such recovery of heat is the more efficient as the wires of grating 4 are finer, since the surface area per unit weight is then larger.

On the other hand, as the meshes cannot be reduced too far without prohibitive pressure drops, several layers of grating are used. The number of the layers is reduced by increasing the revolving speed of the incinerator, thus retaining the heat exchange capacity.

In FIG. 9 there is shown the circulating circuit of the air and fumes. An aperture is provided in the left-hand end wall for bringing in the refuse to be incinerated. The latter aperture is closed by a door 34, also shown in FIG. 11, inside a fixed hopper 40.

As an illustration, an incinerator requiring 5,000 m.³/hr. of air, 3 meters long and with an outside diameter of 1.50 meter on sleeve 1, can include a stack of six gratings with 0.35 mm. wires and 1 mm. meshes, the apparatus revolving at 10 r.p.m.

Figure 11:
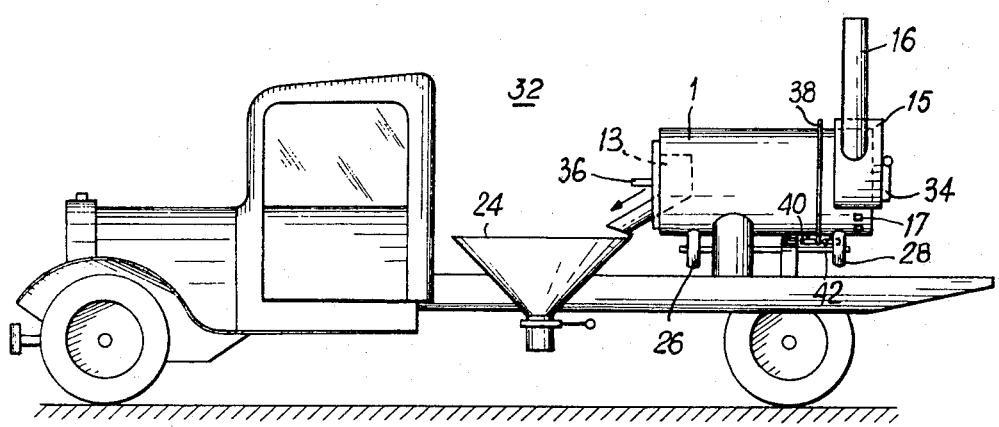
FIG. 11 shows a side view of an incinerator mounted on a truck in which a hopper is used for storage of ashes.

The apparatus rests on rubber-covered rollers. As an illustration, the incinerator rests on four rollers, the axes of which are parallel to the axis of the apparatus, and one or several of which can be driving rollers. Two of these rollers 26, 28 are represented in FIG. 11. Two horizontal side rollers (40, 42 in FIG. 11) clamp a bent iron flat (38 in FIG. 11) the middle line of which is in a plane perpendicular to the axis of the apparatus.

The advantages from this novel type of incinerator are as follows: more uniform combustion, higher thermal efficiency, uniform disposal of ashes and automatic selection of residues; and such incinerators may obviously be improved by suitable control of waste loading, ash and residue disposal and fume circulation.

It is indeed obvious that the scope of the invention is not exceeded by accelerating the circulation of the gases inside the apparatus by means of a fan placed in the path of the fumes. Also, the flow rate of the fumes may be controlled by throttling upstream of the fan. The temperature of the fumes may be lowered by introducing fresh air upstream of the fan, or by means of additional introductions of air into the apparatus through the front or the back. The heat losses through the walls of the incinerator may be further reduced by circulating fresh air along the walls and sending it thereafter into the compartments of the incinerator.

FIG. 11 shows a truck 32 having a supplementary hopper 24 for storing ashes and residues. Incinerator 1 is shown supported by rollers 26, 28, mentioned above; the axis of these rollers is supported by two bearings, in which the left-hand one comprises means for rotating the incinerator about its axis. Box 15, affixed to the floor of the truck, is of a broader type than the one represented on FIG. 9. The support of box 15 and stack 16 is omitted on this figure in order not to confuse it.

Finally, the apparatus and method just described may be applied, not only to the incineration of wastes, but also to the burning of various materials. The clearance between strips 11 and the grates may be varied or even suppressed.

Having described my invention, I claim:

1. A continuous operation waste incinerator, comprising a container, means for rotating the container about a substantially horizontal axis, means defining a plurality of substantially horizontal compartments extending lengthwise of the container, the compartments having radially inner walls spaced a substantial distance away from the axis of the container, said radially inner walls being pervious to air and ashes, said radially inner walls defining a central space for the burning of wastes, means for introducing wastes into said central space at one end of the container, means for removing ashes from the other end of the container, each of said compartments extending along substantially the whole length of the pervious portion of its radially inner wall, said compartments having outside walls, means for introducing air into said compartments comprising means defining apertures through said outside walls only adjacent said one end of the container, means for removing flue gases from at least some of said compartments which are in an upper position as the container rotates, and means for removing ashes from the other end of the container.

2. An incinerator as claimed in claim 1, said radially inner walls being multiperforate.

3. An incinerator as claimed in claim 1, said radially inner walls being each comprised by a stack of wire screens.

4. An incinerator as claimed in claim 1, and partitions separating said compartments from each other, said partitions being radially disposed relative to the axis of rotation of the container.

5. An incinerator as claimed in claim 4, and means mounting said partitions for movement relative to the container to permit expansion and contraction of the partitions parallel to the axis of the container.

6. An incinerator as claimed in claim 4, and means defining the elements of an Archimedean screw in each compartment on said partitions.

7. An incinerator as claimed in claim 4, and means defining the elements of an Archimedean screw in each compartment on the radially outer surfaces of said radially inner walls.

8. An incinerator as claimed in claim 1, said radially inner walls at said other end of the container having relatively large openings therethrough for the discharge of ashes from the adjacent ends of the compartments, and means in said central space at said other end of the container for receiving and removing from the container thus-discharged ashes.

9. An incinerator as claimed in claim 1, and deflectors on the radially inner sides of said radially inner walls, said deflectors being so arranged as so direct wastes toward said other end of the container when the container rotates.

10. An incinerator as claimed in claim 1, said means for removing flue gases comprising a fixed box that communicates successively with said upper compartments as the container rotates.

11. An incinerator as claimed in claim 1, and a fixed plate closing said central space at said other end of the container, means for conducting discharged ashes through said fixed plate, and a burner extending through said fixed plate for initiating the operation of the incinerator.

12. An incinerator as claimed in claim 8, and a truck, the incinerator being mounted on the truck, and a hopper mounted on the truck for receiving ashes and residue from the incinerator.

References Cited

UNITED STATES PATENTS

| | | | |
|---|---|---|---|
| 1,583,436 | 5/1926 | Atkinson | 110—14 |
| 1,929,953 | 10/1933 | Lindhard | 263—32 |
| 2,020,960 | 11/1935 | Pehrson et al. | |
| 2,127,328 | 8/1938 | Egan | 110—14 |

JAMES W. WESTHAVER, *Primary Examiner.*